United States Patent
Pursifull et al.

(10) Patent No.: US 9,528,472 B2
(45) Date of Patent: Dec. 27, 2016

(54) ENHANCED FUEL INJECTION BASED ON CHOKE FLOW RATE

(71) Applicant: Ford Global Technologies, LLC, Dearborn, MI (US)

(72) Inventors: Ross Dykstra Pursifull, Dearborn, MI (US); Samuel Guido, Dearborn, MI (US); Ed Badillo, Flat Rock, MI (US); Dev Saberwal, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 923 days.

(21) Appl. No.: 13/866,721

(22) Filed: Apr. 19, 2013

(65) Prior Publication Data

US 2014/0311454 A1    Oct. 23, 2014

(51) Int. Cl.
| | | |
|---|---|---|
| *F02M 21/02* | (2006.01) | |
| *F02M 37/00* | (2006.01) | |
| *F02M 43/00* | (2006.01) | |
| *F02M 43/04* | (2006.01) | |
| *F02M 69/54* | (2006.01) | |

(52) U.S. Cl.
CPC ..... *F02M 21/0239* (2013.01); *F02M 21/0215* (2013.01); *F02M 37/0017* (2013.01); *F02M 43/00* (2013.01); *F02M 43/04* (2013.01); *F02M 69/54* (2013.01); *Y02T 10/32* (2013.01)

(58) Field of Classification Search
CPC ...... F02D 19/02; F02D 19/021; F02D 19/023; F02D 19/024; F02D 19/026; F02D 19/027; F02D 19/028; F02D 41/0025; F02D 41/0027; F02M 21/02; F02M 21/0239
See application file for complete search history.

(56) References Cited

U.S. PATENT DOCUMENTS

| | | | | |
|---|---|---|---|---|
| 2,446,340 A | * | 8/1948 | Orr | .............................. 123/559 |
| 5,150,690 A | * | 9/1992 | Carter | .................... F02B 43/00 |
| | | | | 123/478 |
| 5,237,981 A | * | 8/1993 | Polletta et al. | ............... 123/527 |
| 5,483,943 A | | 1/1996 | Peters | |

(Continued)

FOREIGN PATENT DOCUMENTS

| | | |
|---|---|---|
| GB | 2345729 A | 7/2000 |
| WO | 2006079173 A1 | 3/2006 |

OTHER PUBLICATIONS

Ulrey, Joseph Norman et al., "System and Method for Emptying a Tank," U.S. Appl. No. 13/431,295, filed Mar. 27, 2012, 33 pages.

*Primary Examiner* — Erick Solis
*Assistant Examiner* — Anthony L Bacon
(74) *Attorney, Agent, or Firm* — Julia Voutyras; Alleman Hall McCoy Russell & Tuttle LLP

(57) ABSTRACT

A method is described for adjusting the amount of gaseous fuel injected based on the sonic choked flow rate through a restriction. Because the sonic choke flow rate continues to decrease as tank pressure decreases, the method includes computing the sonic choke flow rate through the restriction based on system variables and enforcing the rate of CNG injection to be less than the sonic choke flow rate through the restriction. Thereby, the mass flow rate to the fuel injector can be substantially maximized to substantially minimize the time for fuel tank emptying, particularly during the last amount of tank emptying when the contents of the gaseous storage tank is low.

20 Claims, 7 Drawing Sheets

(56) References Cited

U.S. PATENT DOCUMENTS

| | | |
|---|---|---|
| 5,615,702 A | 4/1997 | Dawans et al. |
| 5,632,250 A | 5/1997 | Kato et al. |
| 5,671,711 A * | 9/1997 | Collie ............... F02B 43/00 123/299 |
| 5,873,351 A * | 2/1999 | Vars et al. ............... 123/527 |
| 6,016,832 A * | 1/2000 | Vars et al. ............... 137/487 |
| 6,145,494 A | 11/2000 | Klopp |
| 6,240,910 B1 | 6/2001 | Maekawa et al. |
| 6,390,075 B1 | 5/2002 | Yamazaki et al. |
| 6,405,947 B2 | 6/2002 | Fochtman |
| 6,708,718 B2 | 3/2004 | Yamada et al. |
| 7,287,519 B2 | 10/2007 | Harrison |
| 7,325,561 B2 | 2/2008 | Mathison et al. |
| 7,367,312 B1 | 5/2008 | Boyer et al. |
| 8,166,953 B2 | 5/2012 | Caley |
| 2004/0139944 A1 | 7/2004 | Nakano et al. |
| 2004/0144371 A1 | 7/2004 | Jauss |
| 2006/0130796 A1* | 6/2006 | Harrison ............... 123/184.21 |
| 2006/0246177 A1 | 11/2006 | Miki et al. |
| 2007/0000563 A1 | 1/2007 | Handa |
| 2009/0055077 A1 | 2/2009 | Schule |
| 2010/0307454 A1 | 12/2010 | Ulrey et al. |
| 2011/0132290 A1* | 6/2011 | Leone ............... F02B 43/12 123/3 |
| 2012/0143480 A1 | 6/2012 | Pursifull |
| 2012/0160221 A1* | 6/2012 | Munshi ............... C10L 3/06 123/575 |
| 2013/0098003 A1* | 4/2013 | Pietraszek ............... 60/286 |
| 2013/0199499 A1 | 8/2013 | Pursifull |
| 2013/0333671 A1* | 12/2013 | Wasler et al. ............... 123/480 |
| 2014/0209066 A1* | 7/2014 | Fiveland ............ F02D 19/0626 123/457 |

* cited by examiner

ENHANCED FUEL INJECTION BASED ON CHOKE FLOW RATE

FIELD

The field of the description relates to vehicle fuel systems operating with gaseous fuels.

BACKGROUND AND SUMMARY

Motor vehicles are known that operate on compressed natural gas. CNG is routed through a restriction and pressure regulator to supply CNG at a constant pressure to the engine fuel injectors.

A problem with motor vehicles operating on CNG is that as the tank nears empty, CNG supply to the engine fuel injector is no longer at constant pressure. Consequently, accurate control of the amount of CNG delivered to the engine becomes difficult to control as the fuel tank empties resulting in poor drivability and difficult emission controls.

One approach to addressing this problem has been to require tank refill when CNG pressure (e.g. tank pressure or fuel injection pressure) falls below a predetermined value. This type of approach results in frequent tank refills and limitation of the vehicle range of operation.

In another approach, for vehicles that are capable of operating on either CNG or gasoline, CNG delivery is shut off and only gasoline supplied to the engine when the CNG tank pressure falls below a desired value. Here again, CNG which could otherwise operate the vehicle remains unused in the tank until the next refill.

The inventors herein have discovered the problem with the above approaches and solved the problem. In particular, flow rate through the restriction is at a choked sonic flow where flow velocity in the choked region remains constant at sonic velocity. The inventors further recognized that sonic choke flow rate (in mass terms) continues to decrease as tank pressure decreases. The solution recognized by the inventors is to compute the sonic choke mass flow rate and control the average gaseous injection rate to be always below this value. Accurate control of gaseous fuel injection into the engine is then achievable because when the fuel injection rate is less than the sonically limited mass flow rate, pressure regulation occurs. In a further example, the inventors substantially maximized mass flow rate to the fuel injector to substantially minimize time for fuel tank emptying while maintaining on average mass flow rate from the fuel injector to be less than mass flow rate of gaseous fuel delivered to the fuel injector through the restriction, which in one embodiment may be located in the regulator, but in other embodiments can also be located in other locations within the fuel system. In another example, the inventors added the injection of a liquid fuel into the engine through a liquid fuel injector; and controlled the gaseous fuel injector and the liquid fuel injector to substantially achieve a desired engine operation—such as desired air/fuel control or desired torque control.

It should be understood that the summary above is provided to introduce in simplified form a selection of concepts that are further described in the Detailed Description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
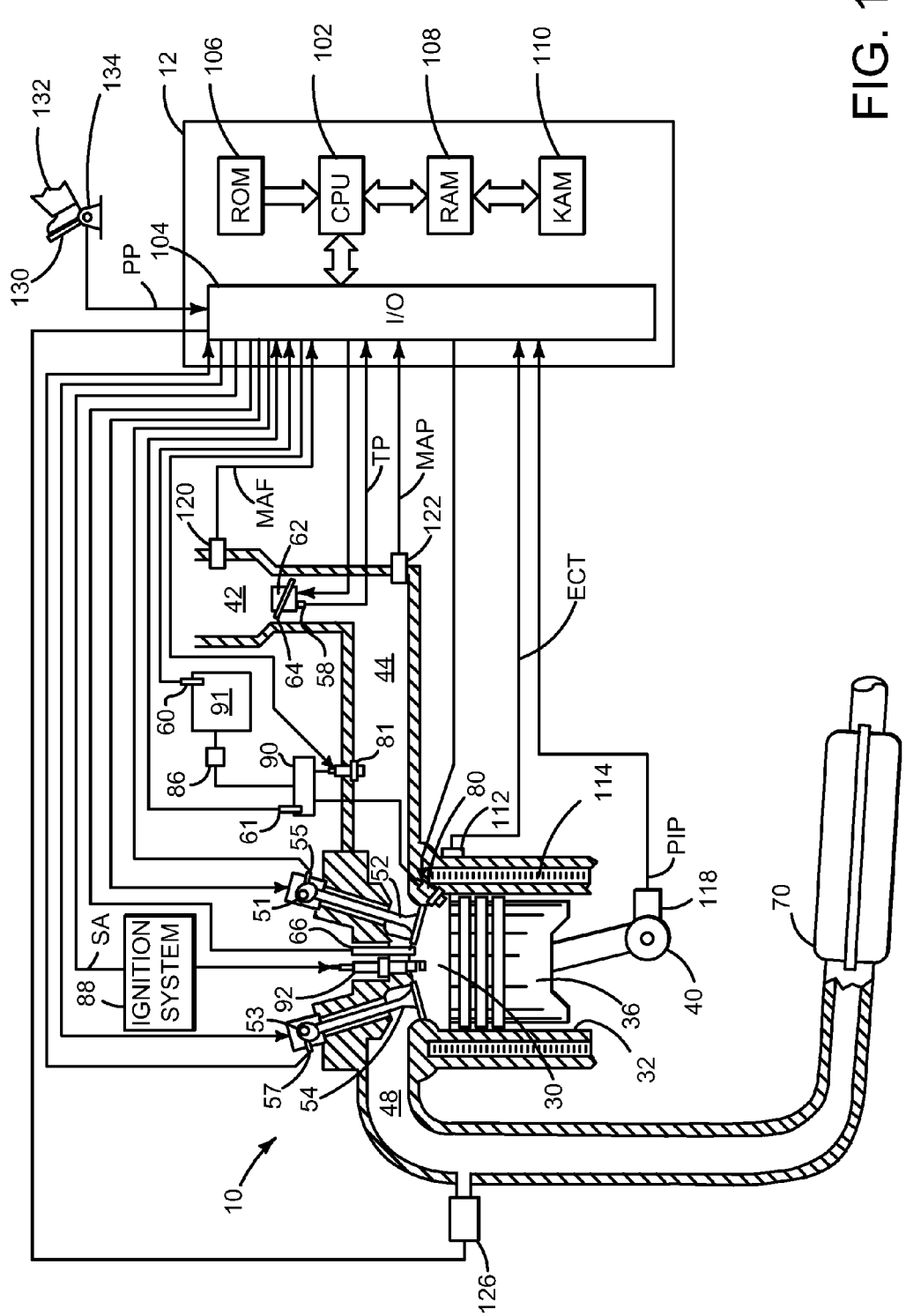
FIG. 1 is a schematic diagram of an engine.
Figure 2:
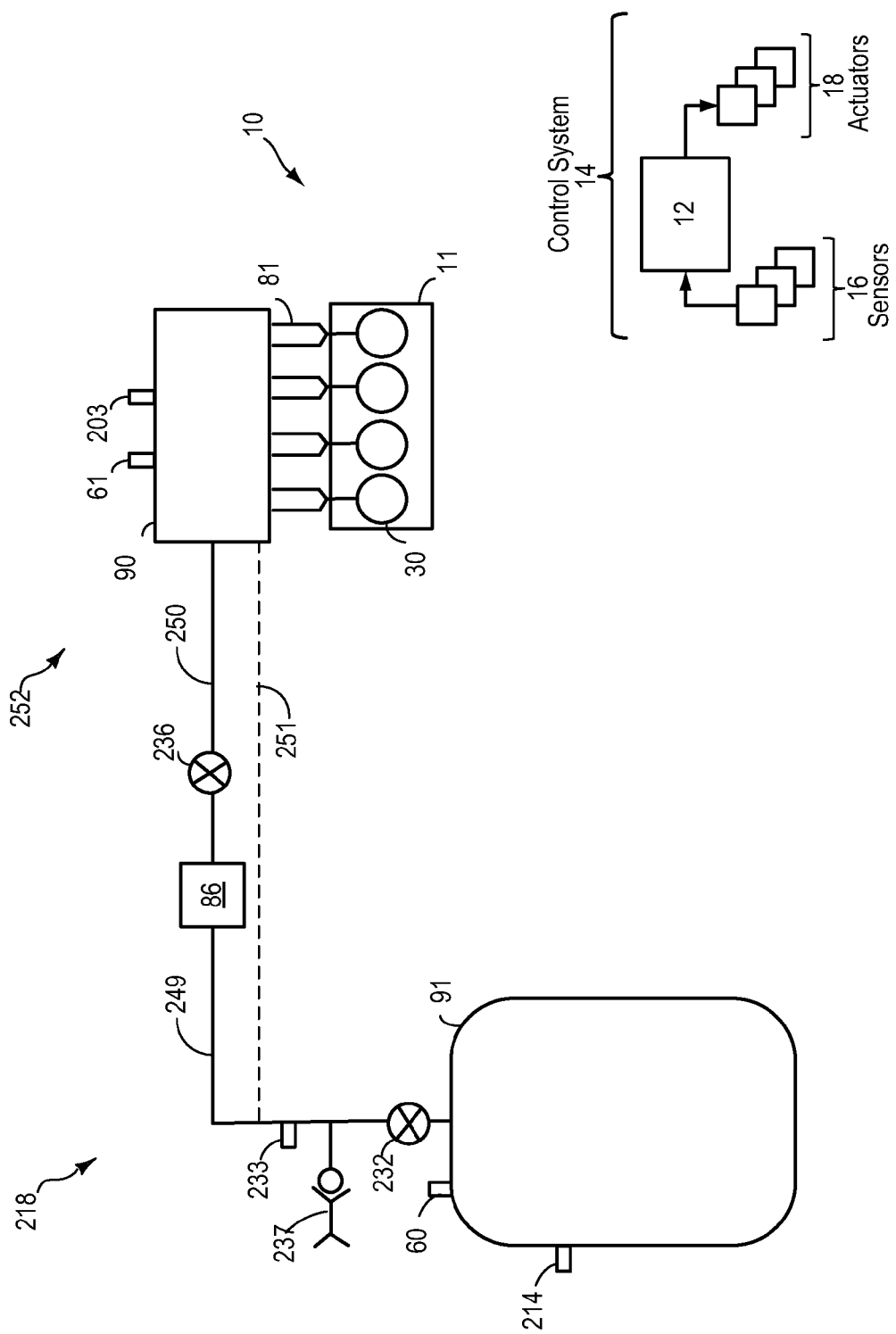
FIG. 2 is a is a schematic diagram of an exemplary embodiment of a gaseous fuel system according to the present disclosure.
Figure 3:
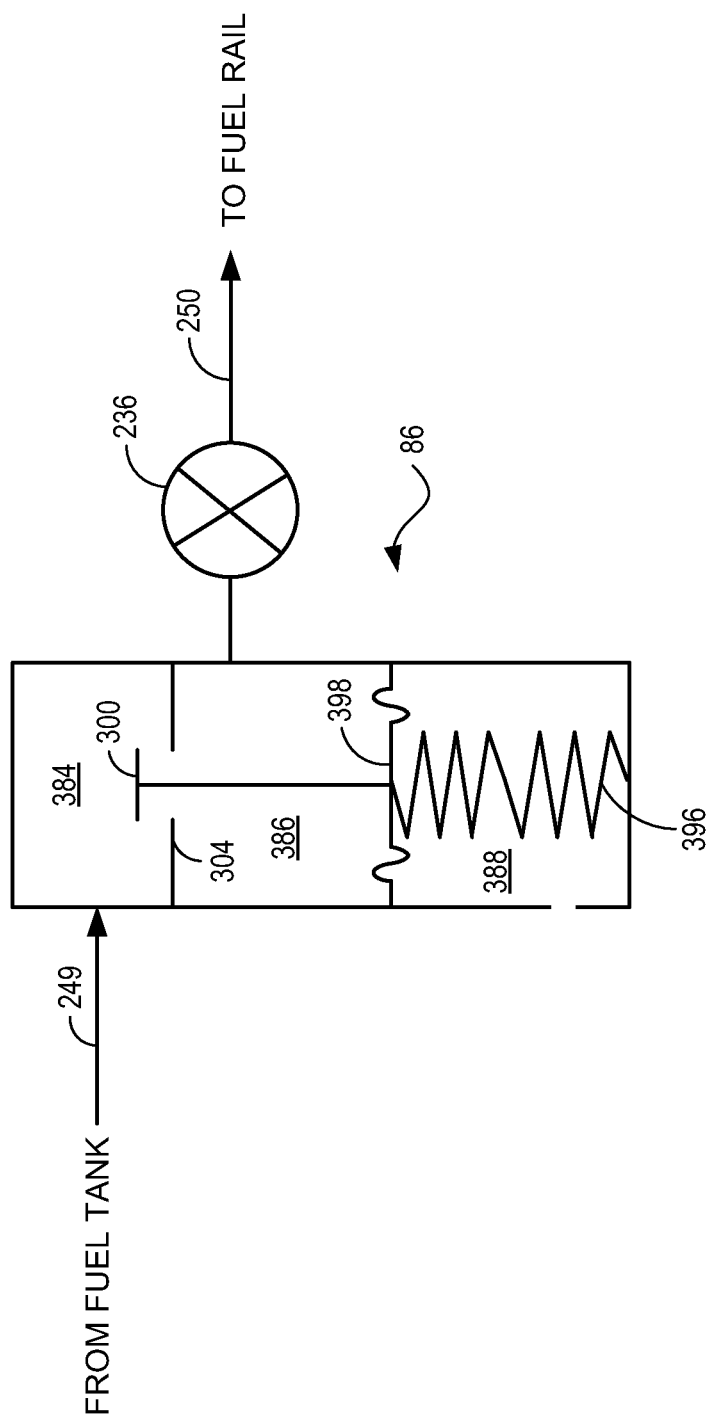
FIG. 3 shows a detail view of the pressure regulation system of FIG. 2.
Figure 4:
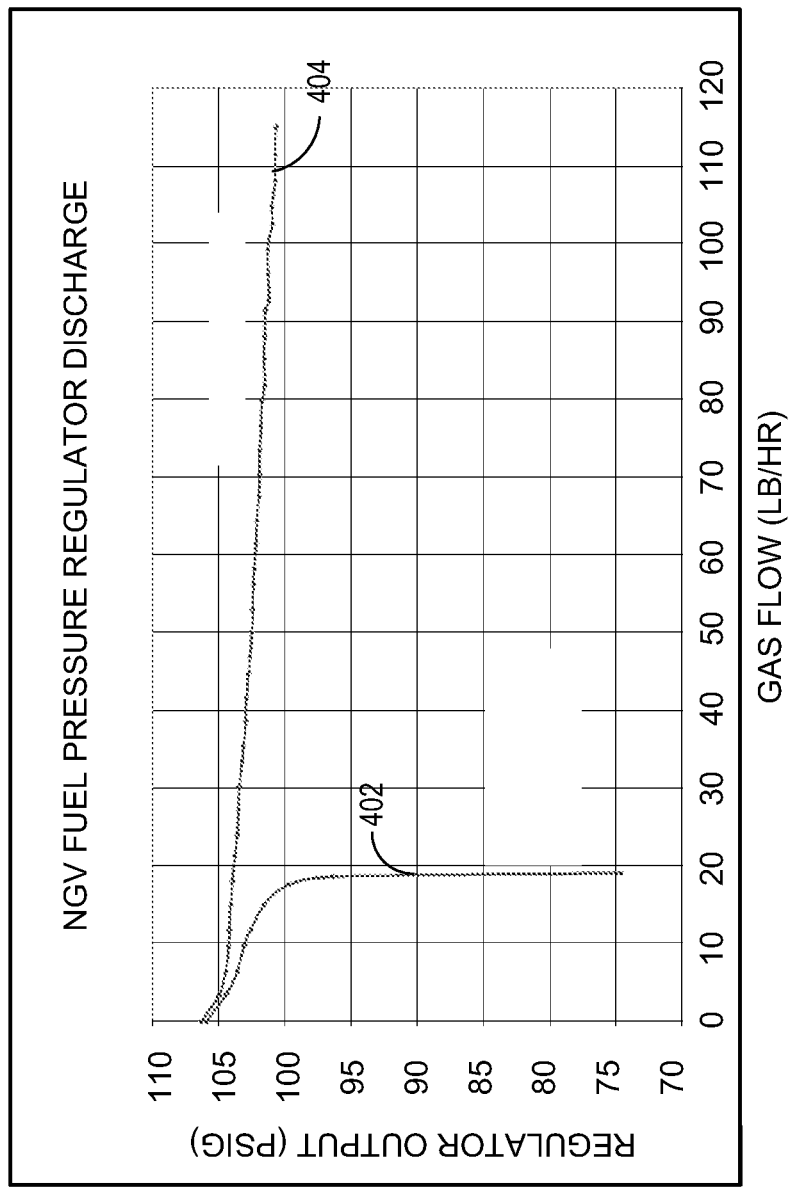
FIG. 4 shows a plot of regulator discharge showing a choked sonic flow.
Figure 5:
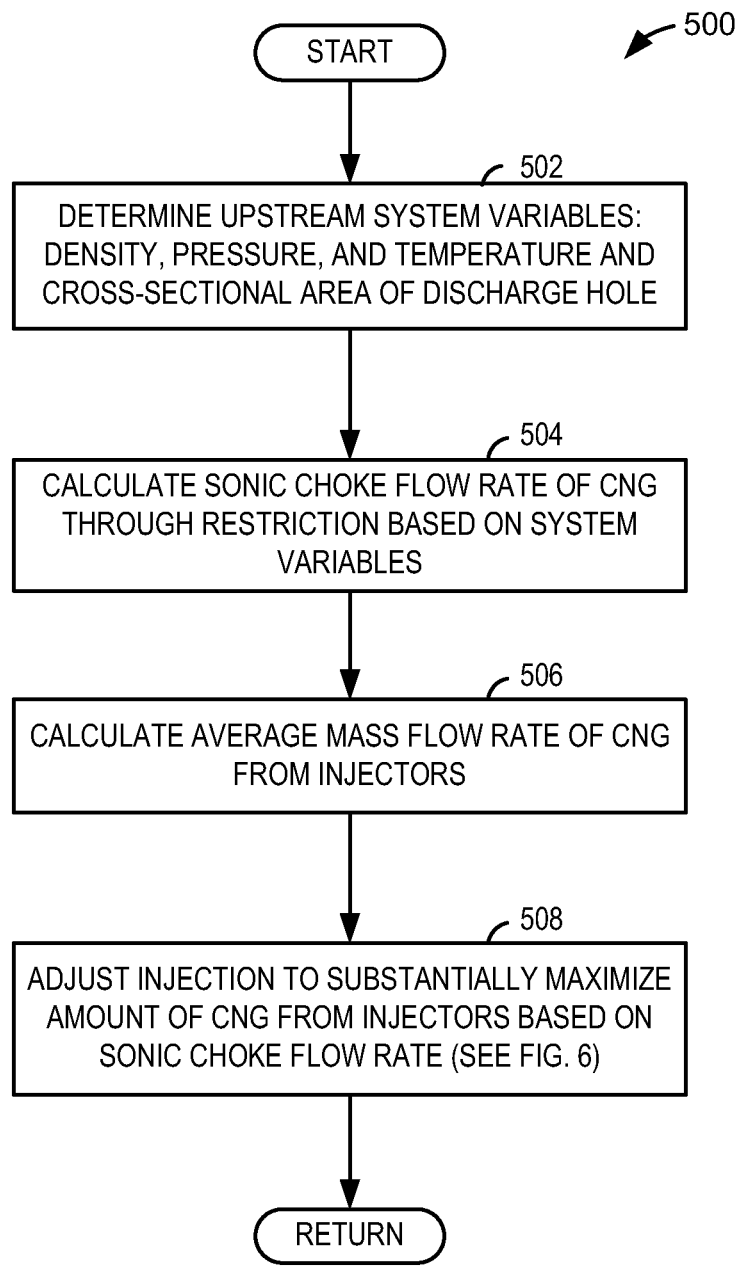
FIG. 5 is a flow chart of an example method for adjusting gaseous fuel injection based on the choked sonic flow.
Figure 6:
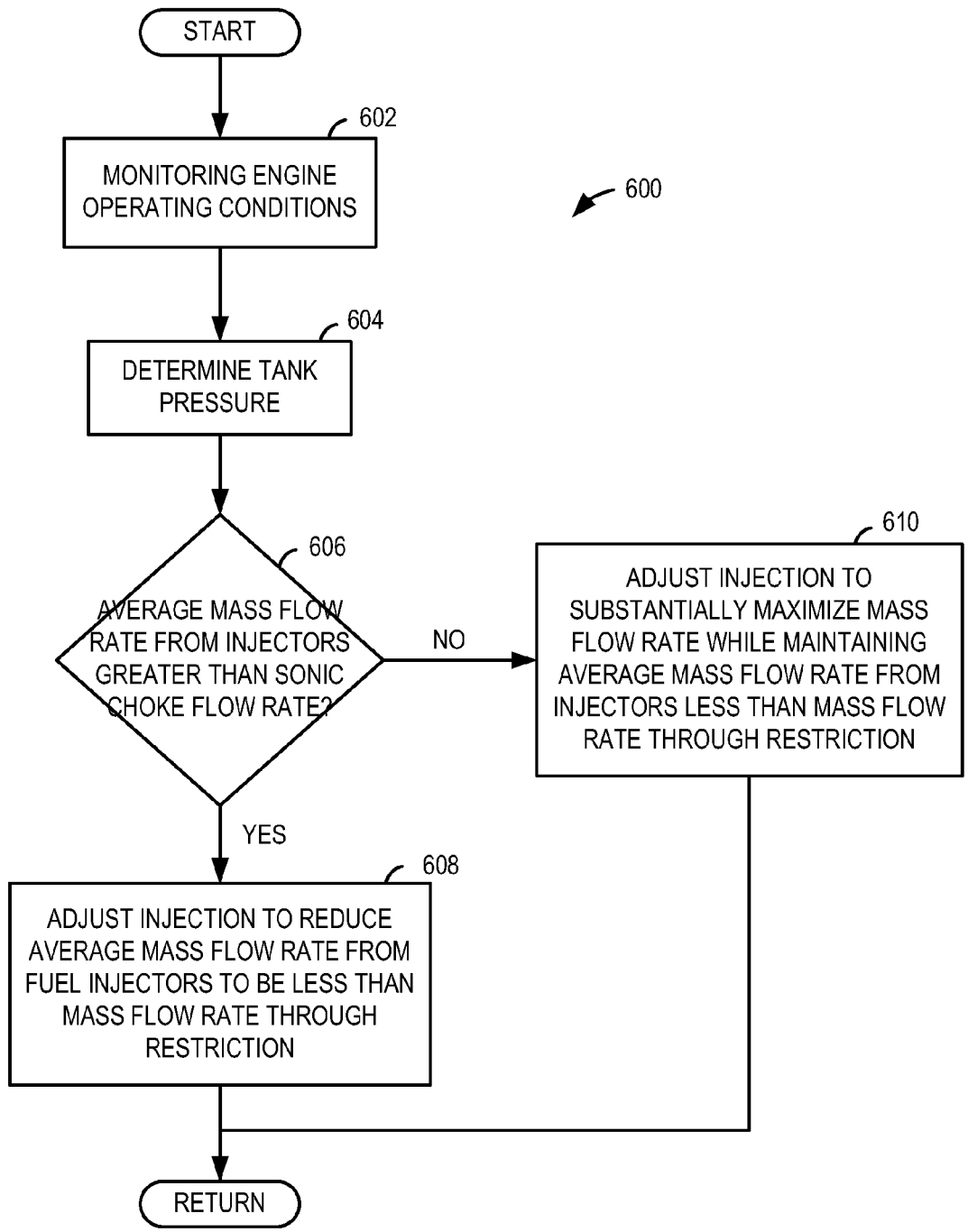
FIG. 6 is a flow chart of an example method for emptying a pressurized tank aboard a vehicle.
Figure 7:
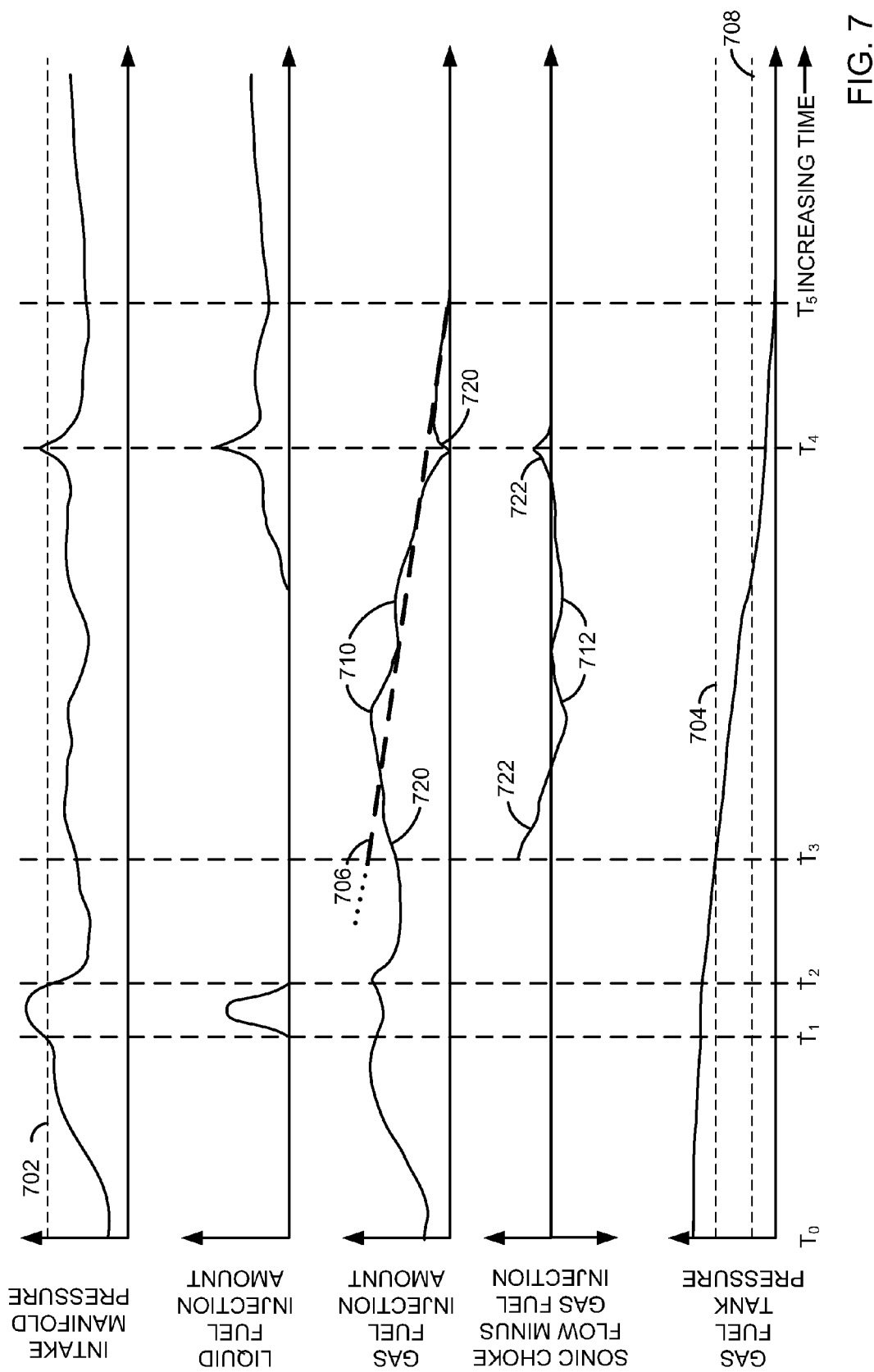
FIG. 7 shows a simulated operating sequence according to the methods of FIGS. 5 and 6.

The present description is related to a method for adjusting the amount of gaseous fuel injected based on a calculated sonic choke flow rate, and co-fueling the engine with a liquid fuel in order to meet a desired load on the engine. Because the methods relate to an engine system, FIGS. 1-3 show schematic diagrams of exemplary systems within the engine. Then, FIG. 4 shows an example flow rate through a restriction during a choked sonic flow where the flow velocity remains constant. In FIGS. 5 and 6, flow charts of example methods for adjusting the rate of flow to substantially minimize time for fuel tank emptying while maintaining on average mass flow rate from the fuel injector to be less than mass flow rate of gaseous fuel delivered through a restriction to the fuel injector are included to illustrate the method. FIG. 7 then shows a simulated operating sequence according to the methods of FIGS. 5 and 6 when the engine has port gaseous fuel injectors. Thus, the sequence of FIG. 7 may be provided by the system of FIGS. 1-3 to solve the problem of FIG. 4 according to the methods of FIGS. 5 and 6. As used herein, substantially minimizing or maximizing flow includes increasing, or reducing, the flow to nearly maximum, or minimum, levels, respectively. As another example, substantially achieving a desired value may include converging to within 5% of the desired value.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Direct liquid fuel injector 66 is shown positioned to inject liquid fuel directly into cylinder 30, which is known to those skilled in the art as direct injection. Alternatively, liquid fuel may be injected to an intake port, which is known to those skilled in the art as port injection. Direct liquid fuel injector 66 delivers liquid fuel in proportion to the pulse width from controller 12. Liquid fuel is delivered to direct liquid fuel injector 66 by a fuel system (not shown) including a fuel tank, fuel pump, and fuel rail (not shown).

Port gaseous fuel injector 81 is shown positioned to inject gaseous fuel into intake manifold 44. For reference, direct gaseous fuel injector 80 is shown positioned to inject gaseous fuel directly into cylinder 30. In some examples, port gaseous fuel injector 81 may be positioned in an intake port of a cylinder head. In other examples, gaseous fuel injector 81 may inject gaseous fuel into a central area of an intake manifold. Both port gaseous fuel injector 81 and direct gaseous fuel injector 80 may provide gaseous fuel to engine 10. However, gaseous fuel may be supplied solely via port gaseous fuel injector 81 without direct gaseous fuel injector 80 in other examples. Additionally, gaseous fuel may be supplied solely via direct gaseous fuel injector 80 without port gaseous fuel injector 81 in still other examples. In general, bi-fuel delivery systems are configured so liquid fuel is directly injected into combustion chamber 30 while gaseous fuel is port injected into intake manifold 44.

Port gaseous fuel injector 81 and direct gaseous fuel injector 80 receive gaseous fuel via fuel rail 90 and storage tank 91. Pressure regulator 86 controls pressure that is delivered to fuel rail 90 by storage tank 91. Herein, pressure of gas in storage tank 91 is sensed via pressure sensor 60, however in some embodiments, pressure of gas in storage tank 91 may be inferred via a high pressure line pressure. Pressure of gas in fuel rail 90 is sensed via pressure sensor 61.

Intake manifold 44 is shown communicating with optional electronic throttle 62 that adjusts a position of throttle plate 64 to control air flow from air intake 42 to intake manifold 44. Electronic throttle 62 is shown positioned in between intake manifold 44 and air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. Generally, during the intake stroke exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIGS. 1 and 2 show schematic depictions of engine 10. As described above, engine system 10 includes a controller 12 and gaseous fuel system 218. The engine system 10 may further include an engine block 11 having a plurality of cylinders 30. During high load conditions direct injection provides multiple advantages. For example, introducing oxygenated, liquid fuels with direct injection and high heat of vaporization at high load provides charge cooling for increased air charge, dilution for combustion temperature control, and knock resistance. On the other hand, port injection may provide advantages during low load conditions. For example, introducing high volatility fuels by intake injection at low load may provide enhanced startability, particulate emission reduction, and less unvaporized fuel. In addition, the gaseous fuel may reduce pumping losses by displacing air. Therefore, by utilizing either direct or port injection over various areas of the speed-load map, the benefits provided by both systems may be substantially maximized.

Gaseous fuel system 218 may include one or more fuel tanks. In the example depicted, the fuel system includes a fuel tank 91 configured to deliver a first fuel having a first chemical and physical property along a first fuel line 249, which is a high pressure fuel line. The fuel stored in fuel tank 91 may be delivered to an injector 81 of engine cylinder 30 via fuel rail 90. In one example, the gaseous fuel system may further include one or more valves to regulate the supply of fuel from fuel tank 91 to injectors 81. Various fuel system components, such as valves, pressure regulators, filters, and sensors, may also be coupled along fuel line 249. Fuel tank 91 may hold a plurality of fuel or fuel blends. For example, the fuel may be a gaseous fuel, such as compressed natural gas (CNG) or hydrogen fuel. In the example of a second fuel tank (not shown), the second fuel may be a liquid fuel, such as gasoline, liquid propane, fuel with a range of alcohol concentrations, various gasoline-ethanol fuel blends (e.g., E10, E85), and combinations thereof.

In the example shown, fuel system 218, and related components, may be configured to deliver a gaseous fuel to the engine cylinders. Accordingly, fuel tank 91 may be coupled to a pressure regulator 86 and a solenoid valve 236 to enable a fixed low pressure supply of the fuel to be provided to injectors 81. A tank valve 232 (e.g., a check valve) may be positioned between fuel tank 91 and pressure regulator 86 to ensure correct injection pressure. As noted already, in some embodiments, tank pressure sensor 60 may be included to detect pressure within the tank. However, in other embodiments a tank output line pressure sensor 233 may be positioned upstream of pressure regulator 86 and downstream of fuel tank 91 to provide an estimate of fuel pressure before pressure regulation by the pressure regulator 86. That is, pressure sensor 233 may provide an estimate of fuel pressure input on the higher pressure side of pressure regulator 86. A fill port 237 may be positioned downstream of tank valve 232 and upstream of the pressure regulator 86 to allow for refueling. Solenoid valve 236 also referred to as a lock-off valve or a line valve may be coupled between pressure regulator 86 and fuel rail 90, which is also referred to as low pressure fuel line 250. In another example, a pressure relief valve (not shown) may be coupled to fuel line 250 downstream of pressure regulator 86. Inclusion of a manually controlled pressure relief valve may provide advantages in service whereas a pressure relief valve controlled by a powertrain control module (PCM) may offer advantages during cold start conditions. For example, during cold start conditions, e.g. when an engine has not yet warmed up after ignition, inward opening injectors may not open when a high fuel rail pressure is present. As such, the PCM may be programmed to actuate the pressure relief valve and thereby reduce the high fuel rail pressure to allow opening of the inward opening injectors. In still another example, gaseous fuel system 218 may optionally include a bypass line 251 that is arranged to direct gaseous fuel from tank 91 around a restriction in pressure regulator 86 when tank pressure is below a predetermined pressure. Therefore, the method may comprise coupling said gaseous fuel from the tank around the restriction in a regulator when tank pressure is less than a predetermined pressure. As such, the pressure regulator and its restriction are bypassed during low fuel tank pressure operations. In one embodiment, a bypass valve may be included that is designed so it cannot be opened or remain open when high pressures (e.g. over 250 psi) are present in the high pressure line, which prohibits very high pressures from occurring at the injectors. A coalescing filter (not shown) may be positioned on the lower pressure side of pressure regulator 86 such that fuel rail lock-off valve 236 is coupled between pressure regulator 86 and the coalescing filter.

In one example, fuel tank 91 may store the gaseous fuel in a pressure range of 10-700 bar (e.g., 3000-6000 psi for CNG fuel, and 5000-10,000 psi for hydrogen fuel) while pressure regulator 86 may regulate the fuel rail pressure to a fixed range of 10-40 bar (e.g., 2-10 bar for CNG fuel). It will be appreciated that while FIG. 2 shows only gaseous fuel system 218, engine 10 is also configured to operate with liquid fuel from an additional fuel tank (not shown).

Engine system 10 may further include control system 14 comprising controller 12 that is shown receiving information from a plurality of sensors 16 (various examples of which are described herein) and sending control signals to a plurality of actuators 18 (various examples of which are described herein). As one example, sensors 16 may include MAP and MAF sensors in the intake, exhaust gas sensor and temperature sensor located in the exhaust, pressure sensor 61 coupled to fuel rail 90 and configured to provide an estimate of the fuel rail pressure, temperature sensor 203 coupled to fuel rail 90 and configured to provide an estimate of the fuel rail temperature, temperature sensor 214 coupled to fuel tank 91 and configured to provide an estimate of the fuel tank temperatures, etc. Other sensors such as pressure, temperature, fuel level, air/fuel ratio, and composition sensors may be coupled to various locations in the engine system 10. As another example, the actuators may include fuel injector 81, solenoid valve 236, pressure regulator 86, throttle 62, tank valve 232, and a pressure relief valve (not shown). The controller may receive input data from the various sensors, process the input data, and trigger the actuators in response to the processed input data based on instructions or code programmed therein corresponding to one or more routines. Example routines are shown in FIGS. 5-6.

As shown in the detailed view of FIG. 3, pressure regulator 86 includes a high pressure chamber 384 which receives gaseous fuel from fuel tank 91 via high pressure fuel line 249, a low pressure chamber 386 which provides pressure-regulated gaseous fuel to fuel rail 90, and a reference chamber 388. In the example embodiment shown, pressure regulator 86 is a mechanical pressure regulator that includes a diaphragm 398 and a valve 300. A position of valve 300 relative to an aperture or orifice in a wall 304 separating high pressure chamber 384 and low pressure chamber 386 determines the mass flow rate of gas through the restriction from 384 to 386, wherein said restriction is incorporated in the fuel pressure regulator. The position of valve 300 depends on the pressure in reference chamber 388 and low pressure chamber 386, and on spring force provided by spring 396 coupled with a bottom of pressure regulator 86 on one end and with a bottom of diaphragm 398 on the other end. In some embodiments, reference chamber 388 may be open to the atmosphere and therefore use atmospheric pressure as a reference pressure. However, in other embodiments, reference chamber 388 may be coupled to an intake manifold pressure. In still other embodiments, the reference pressure may be controlled to adjust a variable pressure regulator. As described herein, pressure regulator 86 is a mechanical pressure regulator that controls a reference chamber pressure to a fixed, constant pressure to achieve a fixed, constant regulating pressure in the low pressure chamber.

A fuel rail lock-off valve 236 arranged in fuel line 250 may be closed to prevent communication between pressure regulator 86 and fuel rail 90 during conditions where gaseous fuel delivery to the engine is not desired (e.g., during engine off conditions, or during conditions where delivery of liquid fuel alone to the engine is desired). Otherwise, fuel rail lock-off valve 236 may be opened so fuel may be delivered from pressure regulator 86 to fuel rail 90. Fuel rail lock-off valve 236 may be a simple valve which is only controllable to a fully open or fully closed state, and which does not serve to vary the pressure of fuel delivered to the fuel rail.

FIG. 4 shows the results of a restricted inlet upstream of pressure regulator 86, wherein the regulator output is plotted as a function of the gas flow rate for two types of regulator discharge. The first plot at 402 corresponds to a choked sonic flow that further shows a decrease in the pressure downstream from pressure regulator 86 produces no increase to the mass flow rate. For example, a vertical line near 19 lb/hr is characteristic of a sonic choke point. This may occur as the tank pressure falls to low levels, e.g. below 500 psi, so that the mass flow rate of the gaseous fuel from tank 91 becomes choked. Therefore, if the average mass flow rate of gaseous fuel delivered to the engine from injectors 81 exceeds the mass flow rate of gaseous fuel through the restriction, the fuel rail pressure from pressure sensor 61 and tank pressure from pressure sensor 60 (or from pressure sensor 233 in high pressure fuel line 249) may drop precipitously as shown in FIG. 4. As such, gaseous fuel system 218 no longer delivers a pressure to injectors 81 due to the flow restriction upstream of the regulator. For reference, the second plot at 404 shows a mass flow rate of gaseous fuel from the tank with no choked sonic flow in the region of practical interest. This plot clearly demonstrates that the storage tank has some gaseous fuel remaining that can be used in accordance with the methods described herein to power engine system 10. For example, as described below, engine system 10 may exhaust the supply of gaseous fuel remaining in tank 91 by computing the sonic choke flow rate, or mass flow rate through the restriction delivered to the injectors and further adjust the rate of injection to be less than the sonic choke flow rate in order to enforce a substantially maximum usage of CNG, particularly when pressures in the storage tank are low.

Turning to control of the methods, FIGS. 5 and 6 show exemplary flow charts for two methods a controller may use to adjust the CNG injection rate based on the sonic choked flow rate. In FIG. 5, method 500 uses the physics of a CNG plumbing system to compute a substantially maximum mass flow rate based on the calculated sonic choked flow rate through the restriction that depends on the tank pressure. Then, in FIG. 6, method 600 senses a desired engine load and uses the calculated sonic choked flow rate through the restriction to adjust the amount of CNG injected in order to substantially maximize the amount of CNG delivered. Finally, according to the methods described herein, and depending on the engine load desired compared to the amount of CNG available for use, controller 12 may further provide a second fuel (e.g. gasoline, electric, etc.) on board a vehicle for co-fueling in order to substantially achieve a desired engine operation—such as desired air/fuel control, desired torque control or idle speed.

Because the methods described calculate the sonic choke flow rate to adjust the CNG injection flow rate, a brief description of the flow computation is in order. When the gas velocity is choked, the mass flow rate depends on the cross-sectional area (A) of the hole, or restriction, in pressure regulator 86 through which the gaseous fuel flows, in addition to the upstream pressure ($P_0$) and temperature ($T_0$). However, as noted above, the rate does not depend on the downstream pressure. An equation for the mass flow rate is given by:

$$\frac{dm}{dt} = C \cdot A \cdot \sqrt{\left( k \cdot \rho_0 \cdot P_0 \left( \frac{2}{k+1} \right)^{\frac{k+1}{k-1}} \right)}$$

where $dm/dt=\dot{m}$ is the mass flow rate (kg/s), C is a dimensionless discharge coefficient, A is the discharge hole cross-sectional area (m$^2$), k is a ratio of the specific heat capacities ($c_p/c_v$) that depends on the identity of the gas (e.g. for methane, k=1.307), $\rho_0$ is the density of the gas upstream of the restriction (kg/m$^3$), $P_0$ is the upstream pressure (Pa), and $T_0$ is the upstream temperature of the gas (K). Although SI units are provided for each variable of the equation, other units are also possible. The above equation may be used to calculate the steady state mass flow rate for a particular gas based on the pressure and temperature existing in the upstream pressure source. Although temperature is included herein, in some instances, the mass flow rate may depend weakly on the upstream temperature.

At 502, method 500 includes determining various upstream system variables like the density, pressure, and temperature of the gaseous fuel, and cross-sectional area of the discharge hole based on the measured tank pressure. Then, based on the upstream system variables determined, at 504, method 500 further includes calculating the sonic flow rate of CNG, for instance, using the equation just described. Because the method adjusts the rate of CNG injected to the cylinders of the engine by keeping the mass flow rate of CNG delivered by the injectors less than the mass flow rate of CNG through the restriction delivered to the injectors, at 506, method 500 includes determining the average mass flow rate of CNG delivered by the injectors. Then, at 508, method 500 includes comparing the two mass flow rates and adjusting injection of CNG to substantially maximize the amount of CNG from the injectors based on the sonic choke flow rate. This may be done to minimize liquid gasoline consumption, which in some instances is more expensive than CNG. Therefore, by maximizing the use of CNG as a substitute fuel for gasoline, the cost of operating a vehicle may be advantageously reduced. As noted above, in some instances, the amount of CNG delivered may provide a portion of the power for a desired engine load. As such, although not explicitly identified in FIG. 5, the method may further provide the remaining portion using, for instance, a liquid fuel direct injected to the engine system.

In FIG. 6, a flow chart illustrating method 600 is shown in which controller 12 makes adjustments within the engine system to substantially maximize the amount of CNG used based on the calculated sonic choke flow rate. Therefore, method 600 comprises operating an engine while emptying a gaseous fuel tank by coupling a gaseous fuel from the tank to a fuel injector through a restriction; and further controlling mass flow rate from said fuel injector to the engine to be on average less than the mass flow rate of said gaseous fuel through the restriction that is delivered to said fuel injector.

At 602, method 600 includes monitoring the engine operating conditions. For instance, during some operating conditions, the engine may operate at a low load, for example, as indicated by position sensor 134 coupled to accelerator pedal 130 for sensing force applied by foot 132. When this is the case, and controller 12 determines that enough gaseous fuel is available for injection based on the sonic choke flow rate, controller 12 may deliver only gaseous fuel to power the engine. However, in other operating conditions, the engine may operate at a higher load such that the gaseous fuel injected may supply a mere portion of the power for operating the engine based on the conditions. Therefore, during these times, controller 12 may activate a second liquid fuel system for direct injection to the cylinder in order to co-fuel the engine while supplying enough liquid fuel to make up the remaining difference based on the engine load detected.

Because the sonic choke flow rate generally depends on the plumbing configuration of the gaseous fuel system as well as the upstream pressure, in some embodiments, the mass flow rate from the tank may be calibrated as a function of the tank pressure for a given plumbing configuration. Therefore, at 604, method 600 includes determining the pressure of the gaseous fuel in the tank since the mass flow rate of said gaseous fuel through the restriction delivered to the injectors may be determined from the gaseous fuel tank pressure. As described in detail above, the tank pressure may be determined by a tank pressure sensor 60 in some embodiments, or in other embodiments by a tank output line pressure sensor 233 positioned downstream of fuel tank 91 to provide an estimate of tank pressure.

Based on the calculated sonic choke flow rate described in FIG. 5, and the engine conditions detected, at 606, method 600 includes comparing the average mass flow rate injected to the engine with the sonic choke flow rate through the restriction calculated from the gaseous tank pressure. Then, based on the comparison, if the average mass flow rate from the injectors is greater than the sonically limited mass flow rate through the restriction, at 608 method 600 includes instructions for reducing the rate of CNG injection to the engine in order to reduce the amount of CNG injected. Conversely, if controller 12 determines that the mass flow rate from the injectors is less than the mass flow rate through the restriction, at 610, method 600 includes adjusting the amount of injection, for instance, by increasing the amount of gaseous fuel delivered to the engine to substantially maximize the mass flow rate while maintaining an average mass flow rate from the injectors less than the sonically limited mass flow rate through the restriction. In this way, control system 14 may use the balance of the gaseous fuel on-board a vehicle based on the engine operating conditions and tank pressure detected while substantially minimizing the time for fuel tank emptying. This is particularly advantageous during the last amount of tank emptying when the contents of the gaseous storage tank are low.

FIG. 7 shows a simulated operating sequence according to the method of FIGS. 5 and 6 when the engine has port gaseous fuel injectors without direct gaseous fuel injectors. The sequence of FIG. 7 may be provided by the system of FIGS. 1-3 according to the method of FIGS. 5 and 6. Vertical markers are shown at times $T_0$-$T_5$ to identify particular times of interest during the sequence.

The first plot from the top of FIG. 7 represents engine input power, which is shown as an intake manifold pressure versus time. The Y axis represents engine intake manifold pressure and intake manifold pressure increases in the direction of the Y axis arrow. The X axis represents time and time increases from the left side of FIG. 7 to the right side of FIG. 7. Horizontal marker 702 represents ambient air pressure. Pressure above ambient pressure is above horizontal marker 702. Pressure below ambient pressure is below horizontal marker 702.

The second plot from the top of FIG. 7 represents liquid fuel injection amount versus time. The Y axis represents the amount of liquid fuel injected to the engine and the amount of liquid fuel injected increases in the direction of the Y axis arrow. The X axis represents time and time increases from the left side of FIG. 7 to the right side of FIG. 7.

The third plot from the top of FIG. 7 represents gaseous fuel injection amount injected to the engine via a port gaseous fuel injector versus time. The Y axis represents an amount of gaseous fuel injected via a port or central injector. The amount of gaseous fuel injected to the engine increases in the direction of the Y axis arrow. The X axis represents time and time increases from the left side of FIG. 7 to the right side of FIG. 7. A portion of choked sonic flow 706, which will be described below and generally depends on the gaseous tank pressure, is also shown in the third plot in order to demonstrate the method.

In the method according to the present disclosure, the energy rate (or power) from the gaseous fuel and the energy rate (or power) from the liquid fuel can be added to arrive at the total input power to the engine, for example in response to a pedal position sensor 134. Therefore, according to one embodiment of the method, the low cost fuel (e.g. the gaseous fuel) may be preferentially used while the high cost fuel (e.g. the liquid fuel) is conserved. For example, in FIG. 7, the engine input power that is indicated by an intake manifold pressure in the first plot from the top of FIG. 7 may be estimated by adding the liquid fuel injection amount that is proportional to the energy rate from the liquid fuel in the second plot from the top of FIG. 7 to the gas fuel injection amount that is proportional to the energy rate from the gaseous fuel in the third plot from the top of FIG. 7. Therefore, as shown therein, the method may operate to preferentially use the less expensive gaseous fuel while conserving the more expensive liquid fuel during vehicle operation.

The fourth plot from the top of FIG. 7 represents a difference plot between the choked sonic flow 706 and the gas fuel injection amount shown in the fourth plot just described. The Y axis represents a difference between the two mass flows where values above the horizontal line indicate positive differences (e.g. where the choked sonic flow is greater than the gas fuel injection amount) and values below the line indicate negative differences (e.g. where the choked sonic flow is less than the gas fuel injection amount). The X axis represents time and time increases from the left side of FIG. 7 to the right side of FIG. 7.

Because the method depends on determining the mass flow rate to the injectors in order to adjust the rate of injection when optimizing CNG usage, in one embodiment, a simple comparison of choked sonic flow 706 to the gaseous fuel injection amount provides an indication of whether the injection of CNG is to be increased or decreased. For example, at 710 the amount of gaseous fuel injected is greater than the choked sonic flow 706, which presents problems in the manner already described since a reading from a pressure sensor will drop precipitously when this occurs. In response to the high injection rate for the conditions, controller 12 may reduce the amount of CNG injected by injectors 81 where the amount by which controller 12 reduces the CNG injection is further determined from a simple comparison of the two curves in the third plot. According to the method, the amount by which CNG is reduced shown at 712 just exceeds the difference indicated. Although shown here as a temporal plot, controller 12 may also include instructions for computing an average CNG injection rate that it compares to the sonic choke flow rate through the restriction when enforcing a substantially maximum average CNG injection rate. For example, in some embodiments, the average CNG rate of injection may refer to the average CNG rate over a number of engine events (perhaps 720° of crank rotation) and not an average over time since fuel injection is a discontinuous process. As another example, at 720, the amount of gaseous fuel injected is less than choked sonic flow 706, which indicates that the amount of gaseous fuel injected is not substantially maximizing CNG usage as it empties the contents of the tank. Therefore, the rate of CNG injection may be increased in order to increase the CNG usage and empty the contents of the gaseous fuel tank faster. For example, the control system may be programmed to increase the CNG usage to 85% of choked sonic flow 706 in order to keep line 720 under line 706 to regulate the pressure of fuel injection while also accommodating for fuel system variability. Based on this difference, 722 shows an example upper limit of the amount by which the CNG injection is increased based on a comparison of the two mass flow rates already described. Because the method is designed to keep the injection rate below the maximum sonic rate available if valve 300 is fully open, in another embodiment, controller 12 may be programmed with instructions to keep the gaseous fuel flow safely to the left of line 402 as opposed to operating on line 402, which substantially maximizes the amount of gaseous fuel used in the process. In this way, pressure regulator 86 may not be substantially maxed out, or saturated, and thus can accomplish pressure control during the fuel management process.

The fifth plot from the top of FIG. 7 represents gaseous fuel rail/storage tank pressure versus time. The Y axis represents fuel pressure within the gaseous fuel storage tank and fuel pressure increases in the direction of the Y axis arrow. The X axis represents time and time increases from the left side of FIG. 7 to the right side of FIG. 7. Horizontal marker 704 represents a first threshold (e.g. 400 psi) where the contents of the gaseous fuel tank are depleted to a point where the mass flow rate from the injectors routinely exceeds the sonic choke flow rate through the restriction. As such, during this time, controller 12 may adjust the flow of CNG to the engine when the load on the engine is low. Horizontal marker 708 represents a second threshold pressure where liquid fuel injection is activated to provide desired combustion in the engine. In one example, horizontal marker 708 represents a gaseous fuel pressure where less than a desired amount of gaseous fuel flows to the engine than desired to provide a desired level of engine torque. Although liquid fuel injection is shown being activated at a later time compared to when the contents of the gaseous fuel tank fall below the first horizontal marker 704, in some embodiments liquid fuel injection may become activated at substantially the same time. Furthermore, the controller may be configured to deliver a combination of liquid and gaseous fuel (e.g. by co-fueling) based on engine load in order to provide a desired level of engine torque at substantially all times. The gaseous fuel pressure is at ambient pressure when the gaseous fuel pressure reaches the X axis. Beyond this point, the gaseous fuel tank may be deactivated until the tank is next filled up.

With respect to the vertical markers indicating different operational periods, at time $T_0$, engine intake manifold pressure is relatively low indicating a low engine load. The liquid fuel injection amount is substantially zero and the engine is operated solely with gaseous fuel, although the engine may have operated earlier in time with liquid fuel (e.g., during engine starting). The gaseous fuel injector is activated and the amount of gaseous fuel stored in the gaseous fuel tank is at a higher level.

Between time $T_0$ and time $T_1$, engine intake manifold pressure increases indicating that the engine is being operated at a higher engine load. The amount of gaseous fuel injected into the engine intake manifold or cylinder intake port increases as the engine intake manifold pressure increases so that the desired engine torque may be provided. The port gaseous fuel injector remains active and the pressure in the gaseous fuel tank decreases as gaseous fuel is consumed by the engine.

At time $T_1$, the engine input power exceeds a threshold, for instance as indicated by an intake manifold pressure that reaches a higher pressure, where the liquid fuel injector is activated. Therefore, when the engine power is high, the liquid fuel injector may supply at least a portion of the fuel delivered to the cylinders in combination with the gaseous fuel. Thus, the amount of liquid fuel injected increases between time $T_1$ and time $T_2$ to increase engine output to meet a desired engine torque. However, the gaseous fuel tank pressure continues to be reduced as gaseous fuel is consumed.

At time $T_2$, the engine intake manifold pressure is reduced to a level where the liquid fuel injector is deactivated. The gaseous fuel injector remains active and the gaseous fuel tank pressure continues to decrease as the gaseous fuel is consumed.

Between time $T_2$ and time $T_3$, intake manifold pressure may increase and decrease with engine load. For example, the engine load may increase or decrease in response to a driver demand torque. Therefore, the gaseous fuel injector remains active as gaseous fuel is injected to the engine. The amount of gaseous fuel stored in the gaseous fuel storage tank continues to decrease as gaseous fuel is consumed by the engine.

At time $T_3$, pressure of the gaseous fuel stored in the gaseous fuel tank decreases to a level less than the predetermined threshold indicated by horizontal marker 704. At pressures below the threshold pressure indicated by horizontal marker 704, less than a desirable amount of fuel may flow from the gaseous fuel storage tank to the engine. As such, and in the manner already described, the amount of CNG injection may be adjusted to substantially maximize CNG usage. The threshold pressure 704 may vary for different operating conditions. For example, the threshold pressure 704 may increase as engine intake manifold pressure increases. The port or central gaseous fuel injector remains active and gaseous fuel continues to flow to the engine at time $T_3$.

Between time $T_3$ and time $T_4$, the amount of gaseous fuel supplied to the engine is augmented by injecting liquid fuel to the engine. Thus, the liquid fuel injector is activated when the gaseous fuel pressure falls below horizontal marker 708 to supply fuel to the engine cylinder. In this way, combustion stability and air-fuel ratio control may be controlled to desirable levels. Additionally, as intake manifold pressure increases with increasing engine load, less gaseous fuel is able to be introduced to the engine intake manifold. Therefore, the amount of liquid fuel as a percentage of both fuels entering the engine is increased as intake manifold pressure increases. As intake manifold pressure decreases with engine load more gaseous fuel can be introduced to the engine and as such the percentage of liquid fuel injected to the engine decreases. An oxygen sensor in the engine exhaust system may be used to correct the liquid fuel amount so that the combined mixture of gaseous and liquid fuel provides a desired air-fuel mixture when combined with air entering engine cylinders. Pressure of gaseous fuel stored in the gaseous storage tank continues to decrease as gaseous fuel is consumed by the engine.

At time $T_4$, the engine intake manifold pressure increases to a level greater than ambient air pressure and so the port or central gaseous fuel injector reduces the amount of gaseous fuel flow into the engine as it temporarily increases the amount of liquid fuel supplied. According to the method, when the gaseous fuel is reduced so that it falls below the calculated choked sonic flow rate, controller 12 may increase the amount of CNG injected in order to empty the contents of the fuel injector faster. However, in some embodiments, the gaseous fuel injector may also be deactivated during this time period since deactivating the gaseous fuel injector reduces the possibility of ambient air entering the gaseous storage tank when intake manifold pressure is high. In this way, air may be prevented from entering the storage tank at higher intake manifold pressures and lower storage tank pressures. The intake manifold pressure may reach pressures higher than ambient pressure when a compressor pressurizes air entering the engine.

Shortly after time $T_4$, the engine intake manifold pressure decreases to a level less than ambient pressure. Since the intake manifold pressure is lower than ambient pressure, the engine intake manifold may assist the flow of gaseous fuel from the storage tank to the engine as long as the mass flow rate from the injectors falls below the mass flow rate through the restriction to the injectors. Thus, pressure of fuel in the gaseous storage tank may be reduced with assistance provided by a low pressure in the engine intake manifold. The liquid fuel injector continues to provide fuel to the engine as the amount of gaseous fuel continues to decrease.

At time $T_5$, pressure in the gaseous storage tank is reduced to ambient pressure and the gaseous fuel injector is deactivated so as to prevent ambient air from entering the gaseous storage tank. Further, deactivating the gaseous fuel injector when pressure of the gaseous fuel tank reaches ambient pressure prevents a vacuum from forming in the gaseous storage tank so that no flow is induced between atmosphere and the gaseous fuel tank. The liquid fuel injector solely provides fuel to the engine after time $T_5$, and the liquid fuel amount is related to the engine load which can be reflected in the engine intake manifold pressure. In other examples, the gaseous storage tank may be reduced to a predetermined vacuum, if desired. In this way, pressure in the gaseous fuel tank may be reduced so that substantially all the fuel in the gaseous storage tank may be used to provide energy to operate the engine. Further, a smooth operating transition between operating the engine solely using gaseous fuel to operating the engine solely using liquid fuel is provided in this way.

Advantages of the methods described include an accurate control of gaseous fuel injection into the engine particularly when the contents of the storage tank are low. Thereby, the mass flow rate injected can be substantially maximized to substantially minimize the time for fuel tank emptying. Further, by limiting the average mass flow rate of CNG from the injectors to be less than the mass flow rate through the restriction (or to the injectors), and co-fueling with a liquid fuel to substantially achieve a desired engine operation—such as desired air/fuel control or desired torque control, the balance of the gaseous fuel system can be exhausted.

In one example, a method for operating an engine while emptying a gaseous fuel tank may comprise coupling a gaseous fuel from the tank to a fuel injector through a pressure regulator with a restriction, and only during selected low tank pressure conditions (e.g., less than a threshold), adjusting injection of gaseous fuel from said fuel injector to the engine to generate a mass flow rate less than choked sonic mass flow rate of said gaseous fuel through said restriction, and further adjusting liquid fuel injection to the engine, during the adjusting of the gaseous fuel injection, based on the adjusted gaseous injection amount and a desired air-fuel ratio in order to maintain combustion to oscillate about the desired air-fuel ratio. The adjustment of the gaseous fuel injection may be based on keeping the mass flow rate below the sonic level by a threshold amount in order to keep gaseous fuel injection continuing as the fuel tank pressure drops to relatively low levels to more fully empty the tank. In particular, as the fuel tank pressure drops, the injection may be adjusted to correspondingly reduce the flow rate through the orifice in proportion with the sonic flow level.

As will be appreciated by one of ordinary skill in the art, routines described herein may represent one or more of any number of fuel injection adjustment controls. As such, various steps or actions illustrated may be performed in the sequence illustrated, in parallel, or in some cases omitted. Likewise, the order of control is not necessarily required to achieve the objects, features, and advantages described herein, but is provided for ease of illustration and description. One of ordinary skill in the art will recognize that one or more of the illustrated steps or actions may be repeatedly performed depending on the particular strategy being used, and may represent code stored in memory of the controller.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine while emptying a gaseous fuel tank, comprising:
   coupling a gaseous fuel from the tank to a fuel injector through a restriction; and
   with a controller, determining a choked sonic mass flow rate of the gaseous fuel through the restriction and controlling a mass flow rate from said fuel injector to the engine to be on average less than the choked sonic mass flow rate of said gaseous fuel through said restriction.

2. The method recited in claim 1, further comprising, with the controller, substantially maximizing said mass flow rate from said fuel injector to substantially minimize time for fuel tank emptying while maintaining on average said mass flow rate from said fuel injector to be less than said choked sonic mass flow rate of said gaseous fuel through said restriction.

3. The method recited in claim 1, wherein said choked sonic mass flow rate of said gaseous fuel through said restriction is determined by the controller from gaseous fuel tank pressure.

4. The method recited in claim 1, wherein the determination of the choked sonic mass flow rate of said gaseous fuel through said restriction is performed by the controller when gaseous fuel flows through said restriction at a substantially constant velocity, and wherein the choked sonic mass flow rate is determined as a function of a pressure in the gaseous fuel tank.

5. The method of claim 1, wherein said fuel injector is coupled to an engine intake manifold.

6. The method recited in claim 1, wherein said fuel injector is coupled directly to an engine combustion chamber.

7. The method recited in claim 1, wherein said restriction is incorporated in a fuel pressure regulator.

8. The method recited in claim 7, further comprising coupling said gaseous fuel from the tank around said restriction and around said regulator when tank pressure is less than a predetermined pressure.

9. A method for controlling an engine while emptying a gaseous fuel tank, comprising:
- coupling a gaseous fuel from the tank to a gaseous fuel injector through a restriction;
- with a controller, determining a choked sonic mass flow rate of the gaseous fuel through the restriction and controlling a mass flow rate from said fuel injector to the engine to be on average less than the choked sonic mass flow rate of said gaseous fuel through said restriction;
- injecting a liquid fuel into the engine through a liquid fuel injector; and
- with the controller, controlling said gaseous fuel injector and said liquid fuel injector to substantially achieve a desired engine operation.

10. The method recited in claim 9, wherein said desired engine operation is engine operation at a desired air/fuel ratio.

11. The method recited in claim 9, wherein said desired engine operation is engine operation to achieve a desired engine torque.

12. The method recited in claim 9, further comprising, with the controller, substantially maximizing said mass flow rate from said fuel injector to substantially minimize time for fuel tank emptying while substantially maintaining said mass flow rate from said fuel injector to be less than the choked sonic mass flow rate of said gaseous fuel through said restriction.

13. The method recited in claim 9, wherein said gaseous fuel injector is connected to an engine intake manifold to deliver gaseous fuel to said engine through an engine intake valve.

14. The method recited in claim 9, wherein said gaseous fuel injector is connected to an engine combustion chamber to deliver gaseous fuel directly into said combustion chamber.

15. The method recited in claim 9, wherein said restriction is incorporated in a fuel pressure regulator.

16. The method recited in claim 15, further comprising coupling said gaseous fuel from the tank around said restriction and around said regulator when tank pressure is less than a predetermined pressure.

17. A method for controlling an engine while emptying a gaseous fuel tank, comprising:
- coupling a gaseous fuel from the tank to a gaseous fuel injector through a restriction and a pressure regulator;
- with a controller, determining a sonically limited mass flow rate of the gaseous fuel through the restriction, and substantially maximizing a mass flow rate of the gaseous fuel from said fuel injector to substantially minimize a time for fuel tank emptying while substantially maintaining said mass flow rate of the gaseous fuel from said fuel injector to be less than the sonically limited mass flow rate of said gaseous fuel through said restriction;
- injecting a liquid fuel into the engine through a liquid fuel injector; and
- with the controller, controlling said liquid fuel injector to substantially achieve a desired engine operation.

18. The method recited in claim 17, wherein said desired engine operation is engine operation at a desired air/fuel ratio.

19. The method recited in claim 17, wherein said desired engine operation is engine operation to achieve a desired engine torque.

20. The method recited in claim 17, wherein said desired engine operation is engine operation to achieve a desired idle speed.

\* \* \* \* \*